United States Patent
Takeuchi et al.

(10) Patent No.: US 8,383,704 B2
(45) Date of Patent: Feb. 26, 2013

(54) PROCESS FOR PRODUCING MOLDED PROPYLENE POLYMER PRODUCT CONTAINING FIBROUS INORGANIC FILLER

(75) Inventors: Atsushi Takeuchi, Saitama (JP);
Shinichi Yamamoto, Yamaguchi (JP);
Takashi Kishimoto, Yamaguchi (JP)

(73) Assignees: Honda Motor Co., Ltd., Minato-ku, Tokyo (JP); Ube Material Industries, Ltd., Ube-shi, Yamaguchi (JP)

( * ) Notice: Subject to any disclaimer, the term of this patent is extended or adjusted under 35 U.S.C. 154(b) by 302 days.

(21) Appl. No.: 12/964,248

(22) Filed: Dec. 9, 2010

(65) Prior Publication Data

US 2011/0077336 A1    Mar. 31, 2011

(51) Int. Cl.
*C08J 3/20* (2006.01)
(52) U.S. Cl. .......................... 523/351; 524/423
(58) Field of Classification Search .................. 523/351; 524/423
See application file for complete search history.

(56) References Cited

U.S. PATENT DOCUMENTS

2008/0161474 A1*   7/2008   Shimouse et al. ............ 524/449

FOREIGN PATENT DOCUMENTS

| JP | 61-072038 | 4/1986 |
|---|---|---|
| JP | 04-275351 | 9/1992 |
| JP | 2003-073524 | 3/2003 |
| JP | 2004-274661 | 9/2004 |
| JP | 2006-083369 | 3/2006 |
| JP | 2007-161954 | 6/2007 |

* cited by examiner

*Primary Examiner* — Edward Cain
(74) *Attorney, Agent, or Firm* — Nixon Peabody LLP; Jeffrey L. Costellia (57) ABSTRACT

A molded propylene polymer product improved in flexural properties and/or impact resistance is prepared by a process comprising the steps of blending fibrous inorganic filler-containing pellets with a propylene polymer-containing matrix resin composition, in which the pellets comprises 35-80 wt. % of a fibrous inorganic filler, 1-45 wt. % of an olefin polymer, 5-45 wt. % of an elastomer, and 0.3-10.0 wt. % of a specific lubricant; kneading the blended product under molten condition; and molding the kneaded product.

18 Claims, 1 Drawing Sheet

PROCESS FOR PRODUCING MOLDED PROPYLENE POLYMER PRODUCT CONTAINING FIBROUS INORGANIC FILLER

FIELD OF THE INVENTION

The present invention relates to a process for producing a molded propylene polymer product containing a fibrous inorganic filler. The invention also relates to fibrous inorganic filler-containing pellets employable for performing the above-mentioned process.

BACKGROUND OF THE INVENTION

It is known that use of molded resin products as interior and/or exterior parts of automobiles is advantageous for reducing weight of automobiles. A well-known resinous material employed for producing the molded resin product is a propylene polymer composite comprising a propylene polymer as a main component and auxiliary components such as an inorganic filler and an elastomer. The propylene polymer is thermoplastic resin which is good in molding characteristics and thermal stability. The inorganic filler and elastomer are employed to improve flexural properties and impact resistance of the molded product.

Examples of the inorganic filler include a fibrous inorganic filler and a non-fibrous inorganic filler. Examples of the fibrous inorganic filler include fibrous basic magnesium sulfate and fibrous potassium titanate. Examples of the non-fibrous inorganic filler include talc and mica.

U.S. Pat. No. 7,655,721 B2 (corresponding to JP 2006-83369 A) discloses a method for preparing a propylene-based resin composition containing a fibrous inorganic filler, a non-fibrous inorganic filler and an elastomer. The disclosed method employs a master batch resin composition (preferably, in the form of pellets) comprising a first propylene polymer and a fibrous inorganic, filler. The master batch composition is then mixed with a second propylene polymer, a non-fibrous inorganic filler and an elastomer to give the target resin composition. U.S. Pat. No. 7,655,721 B2 further describes that the molded resin product produced using the fibrous inorganic filler-containing propylene-based master batch pellets is superior in balance between rigidity and impact resistance.

Recently, the requirement for further reducing weights of the interior and/or exterior parts of automobiles has increased. This means that a molded resin product produced from a resin composition should have increased physical strength such as increased flexural strength and increased impact resistance.

SUMMARY OF THE INVENTION

Accordingly, it is an object of the present invention to provide a process for producing a molded resin product which shows increased flexural strength and/or increased impact resistance.

The present inventors have studied the process for preparing fibrous inorganic filler-containing propylene polymer composition which utilizes master batch pellets comprising a propylene polymer and fibrous inorganic filler, for the purpose of obtaining fibrous inorganic filler-containing propylene polymer composition which enables to produce molded resin products having increased flexural strength and/or increased impact resistance. As a result of the study, the inventors have found that the desired fibrous inorganic filler-containing propylene polymer composition favorably employable for producing molded resin products having increased flexural strength and/or increased impact resistance can be prepared by the use of master batch pellets comprising not only a propylene polymer (or other olefin polymer) and a fibrous inorganic filler but also an elastomer and an appropriate lubricant.

Accordingly, the present invention resides in a process for producing a molded propylene polymer product containing a fibrous inorganic filler, which comprises the steps:

blending fibrous inorganic filler-containing pellets with a matrix resin composition containing a propylene polymer, said pellets comprising a fibrous inorganic filler in an amount of 35 to 80 wt. %, an olefin polymer in an amount of 1 to 45 wt. %, an elastomer in an amount of 5 to 45 wt. %, and a lubricant selected from the group consisting of a fatty acid, a metal salt of a fatty acid, and a fatty acid ester in an amount of 0.3 to 10.0 wt. %, said amounts being based on the total weight amount of the pellets;

kneading the blended product under molten condition; and molding the kneaded product.

The present invention further resides in fibrous inorganic filler-containing pellets comprising a fibrous inorganic filler in an amount of 35 to 80 wt.%, an olefin polymer in an amount of 1 to 45 wt. %, an elastomer in an amount of 5 to 45 wt. %, and a lubricant selected from the group consisting of a fatty acid, a metal salt of a fatty acid, and a fatty acid ester in an amount of 0.3 to 10.0 wt. %, said amounts being based on the total weight amount of the pellets.

PREFERRED EMBODIMENTS OF THE INVENTION

Preferred embodiments of the inventions are described below.

(1) The process of the invention wherein the step of blending fibrous inorganic filler-containing pellets with a matrix resin composition is conducted in a blending apparatus, and the step of kneading the blended product and the step of molding the kneaded product are successively conducted in a molding apparatus.

(2) The process of the invention wherein the step of blending fibrous inorganic filler-containing pellets with a matrix resin composition and the step of kneading the blended product are conducted in a kneading apparatus, and the step of molding the kneaded product is conducted in a molding apparatus.

(3) The process of the invention wherein the fibrous inorganic filler comprises fibrous basic magnesium sulfate.

(4) The process of the invention wherein the lubricant comprises the metal salt of a fatty acid, said metal being selected from the group consisting of magnesium, calcium, lithium, and zinc.

(5) The process of the invention wherein the lubricant comprises the fatty acid and the metal salt of a fatty acid in a weight ratio of 2:8 to 8:2.

(6) The process of the invention wherein the olefin polymer is a propylene polymer.

(7) The process of the invention wherein the elastomer is selected from the group consisting of ethylene-butene elastomer, ethylene-octene elastomer, and styrene unit-containing elastomer.

(8) The process of the invention wherein the fibrous inorganic filler-containing pellets contain a fibrous inorganic filler in an amount of 73 to 99 weight parts based on 100 weight parts of the total amount of the olefin polymer and fibrous inorganic filler.

(9) The process of the invention wherein the matrix resin composition contains the propylene polymer in an amount of at least 30 wt. %.

(10) The process of the invention wherein the matrix resin composition is a mixture comprising the propylene polymer in an amount of 30 to 80 wt. %, talc in an amount of 5 to 40 wt. %, and an elastomer in an amount of 5 to 60 wt. %.

(11) The process of the invention wherein the matrix resin composition is a kneaded product prepared under molten condition, said kneaded product comprising the propylene polymer in an amount of 30 to 80 wt. %, talc in an amount of 5 to 40 wt. %, and an elastomer in an amount of 5 to 60 wt. %.

(12) The process of the invention wherein the fibrous inorganic filler-containing pellets and the matrix resin composition are blended in a weight ratio of 3:97 to 55:45.

(13) The fibrous inorganic filler-containing pellets of the invention wherein the fibrous inorganic filler comprises fibrous basic magnesium sulfate.

(14) The fibrous inorganic filler-containing pellets of the invention wherein the lubricant comprises the metal salt of a fatty acid, said metal being selected from the group consisting of magnesium, calcium, lithium, and zinc.

(15) The fibrous inorganic filler-containing pellets of the invention wherein the lubricant comprises the fatty acid and the metal salt of a fatty acid in a weight ratio of 2:8 to 8:2.

(16) The fibrous inorganic filler-containing pellets of the invention wherein the olefin polymer is a propylene polymer.

(17) The fibrous inorganic filler-containing pellets of the invention wherein the elastomer is selected from the group consisting of an ethylene-butene elastomer, an ethylene-octene elastomer, and a styrene unit-containing elastomer.

(18) The fibrous inorganic filler-containing pellets of the invention wherein the fibrous inorganic filler-containing pellets contain a fibrous inorganic filler in an amount of 73 to 99 weight parts based on 100 weight parts of the total amount of the olefin polymer and fibrous inorganic filler.

[Olefin Polymer]

The olefin polymer preferably has a melt flow rate (MFR determined by the method of ASTM D1238, temperature: 230° C., weight: 2.16 kg) in the range of 3 to 300 g/10 min. Examples of the olefin polymers include polyethylene, polypropylene, and ethylene-propylene copolymer. One olefin polymer can be used alone. Otherwise, two or more olefin polymers can be used in combination. The olefin polymer preferably is propylene polymer.

In the present invention, the term "propylene polymer" means an essentially crystalline propylene homopolymer or an essentially crystalline propylene copolymer comprising 50 molar percent or more of propylene unit and remaining molar percent of other α-olefin unit. The copolymer comprising the propylene unit and α-olefin unit preferably is a block copolymer. Examples of α-olefin monomers for the α-olefin unit which are copolymerized with propylene include 1-butene, 4-methyl-1-pentene, 1-hexene, 1-octene, 1-decene, 1-dodecene, 1-tetradecene, 1-hexadecene, 1-octadecene, and 1-icosene. The olefin polymer can be replaced with a matrix resin composition containing a propylene polymer which is described hereinbelow in more detail.

In the fibrous inorganic filler-containing pellets, the olefin polymer should be contained in an amount of 1 to 45 wt. %, preferably in an amount of 1 to 20 wt. %, based on the amount of the pellets.

[Fibrous Inorganic Filler]

Examples of the fibrous inorganic filler include fibrous basic magnesium sulfate (i.e., fibrous magnesium oxysulfate), magnesium hydroxide fiber, aluminum borate fiber, calcium silicate fiber, calcium carbonate fiber, carbon fiber, carbon hollow fiber, glass fibers, and metal fibers. The fibrous basic magnesium sulfate is preferred. The fibrous inorganic filler can be used without surface treatment. However, it may be preferred to subject the filler to surface treatment using a conventional silane coupling agent or a metal salt of a higher fatty acid to improve interfacial adhesion to the polymer or to improve dispersability in the polymer.

Examples of the metal salts of a higher fatty acid include calcium stearate, magnesium stearate, and zinc stearate. The fibrous inorganic filler can be in the form of powder, flakes, or granules. The fibrous inorganic filler in the form of granules is preferred because the granular filler can be easily handled.

The fibrous basic magnesium sulfate used as the fibrous inorganic filler preferably has an average fiber length in the range of 3 to 30 μm and an average fiber diameter in the range of 0.1 to 1.0 μm. The average fiber length and diameter mean the averages of the fiber lengths and diameters measured in an image of a scanning electron microscope (SEM).

The fibrous basic magnesium sulfate can be in the form of aggregate or assembly of fibrous granules.

The amount of the fibrous inorganic filler contained in the pellets is in the range of 35 to 80 wt. %, preferably in the range of 50 to 80 wt. %, based on the amount of the pellets. From other aspect, the amount of the fibrous inorganic filler preferably is in the range of 73 to 99 weight parts, more preferably in the range of 80 to 99 weight parts, based on 100 weight parts of the total amount of the olefin polymer and fibrous inorganic filler.

[Elastomer]

The elastomer contained in the fibrous inorganic filler-containing pellets of the invention preferably is an ethylene-α-olefin copolymer elastomer or a styrene unit-containing elastomer.

The ethylene-α-olefin copolymer elastomer can be a copolymer of ethylene and α-olefin copolymer or a copolymer of ethylene, α-olefin and a non-conjugated diene. Examples of the α-olefins include 1-butene, 1-pentene, 1-hexene, 1-heptene, and 1-octene. Examples of the non-conjugated dienes include dicyclopentadiene, 1,4-hexadiene, cyclooctadiene, dicyclooctadiene, methylenenorbornene, 5-ethylidene-2-norbornene, 5-vinyl-2-norbornene, 5-methylene-2-norbornene, 5-methyl-1,4-hexadiene, and 7-methyl-1,6-octadiene.

The ethylene-α-olefin copolymer elastomer can be ethylene/propylene elastomer (EPR), ethylene/1-butene elastomer (EBR), ethylene/1-octene elastomer (EOR), ethylene/propylene/non-conjugated diene elastomer (EPDM), ethylene/propylene/1-butene elastomer (EPBR), ethylene/1-butene/non-conjugated diene elastomer (EBDM), and ethylene/propylene/1-butene/non-conjugated diene elastomer (EPBDM). The preferred ethylene-α-olefin copolymer elastomer is an ethylene/butene elastomer (comprising unites derived from ethylene and unites derived from 1-butene) and an ethylene/octene elastomer (comprising units derived from ethylene and units derived from 1-octene).

The ethylene-α-olefin copolymer elastomer may have a melt flow rate (MFR determined by the method of ASTM D1238 at 190° C. using a weight of 2.16 kg) of more than 0.1 g/10 min., preferably in the range of 0.3 to 20 g/10 min.

The ethylene-α-olefin copolymer elastomer can be used alone or in combination.

The styrene unit-containing elastomer can be a block copolymer comprising a styrene block and a conjugated diene polymer block, or a block copolymer comprising a styrene block and a block formed by hydrogenating a double bond of the conjugated diene polymer block. The styrene unit-containing elastomer can be styrene/butadiene block copolymer elastomer (SBR), styrene/butadiene/styrene block copolymer elastomer (SBS), styrene/isoprene/styrene block copolymer elastomer (SIS), styrene/ethylene/butene/styrene block copolymer elastomer (SEBS), and styrene/ethylene/propylene/styrene block copolymer elastomer (SEPS). The block copolymers can be hydrogenated. The styrene unit-containing elastomer usually may have a melt flow rate (MFR, determined by the method of ASTM-D1238, temperature: 230° C., weight: 2.16 kg) of more than 0.1 g/10 min., preferably in the range of 0.1 to 100 g/10 min., and more preferably in the range of 0.5 to 20 g/10 min.

The styrene unit-containing elastomer can be used alone or in combination. Otherwise, the styrene unit-containing elastomer can be used in combination with the ethylene-α-olefin copolymer elastomer.

Most preferred elastomers are ethylene/1-butene elastomer (EBR), ethylene/1-octene elastomer (EOR), and styrene/ethylene/propylene/styrene block copolymer elastomer (SEPS).

The amount of the elastomer in the fibrous inorganic filler-containing pellets preferably is in the range of 5 to 45 wt. %, more preferably in the range of 10 to 40 wt. %, based on the amount of the pellets.

[Lubricant]

The fibrous inorganic filler-containing pellets of the invention should contain a lubricant selected from the group consisting of a fatty acid, a fatty acid ester, and a metal salt of a fatty acid.

The fatty acid preferably has 12 to 22 carbon atoms. The fatty acid can be either a saturated fatty acid or an unsaturated fatty acid. Examples of the saturated fatty acids include lauric acid, tridecanoic acid, myristic acid, pentadecanoic acid, palmitic acid, heptadecanoic (margaric) acid, stearic acid, nonadecanoic acid, icosanoic (arachidic) acid, and docosanoic (behenic) acid. Examples of the unsaturated fatty acids include tetradec-9-enoic (myristoleic) acid, hexadec-9-enoic (palmitoleic) acid, oleic acid, elaidic acid, octadec-11-enoic (vaccenic) acid, icon-9-enoic (gadoleic) acid, and docos-13-enoic (erucic) acid.

The fatty acid ester preferably is an ester of the above-mentioned fatty acid. The fatty acid esters can be a fatty acid ester of a monohydric alcohol, a fatty acid ester of a polyhydric alcohol, and a fatty acid ester of a polyglycol.

The metal salt of a fatty acid preferably is a metal salt of the above-mentioned fatty acid. The metal salt preferably is a magnesium salt, a calcium salt, a lithium salt, or a zinc salt. The magnesium salt is particularly preferred.

The lubricants can be used singly or in combination. The amount of the lubricant in the fibrous inorganic filler-containing pellets preferably is in the range of 0.3 to 10.0 wt. %, more preferably in the range of 0.5 to 5.0 wt. %, based on the amount of the pellets.

[Other Components]

The fibrous inorganic filler-containing pellets can further contain an other additives such as oxidation inhibitors, ultraviolet absorbers, pigments, antistatic agents, anti-copper agents, frame retarders, other lubricants, neutralizers, foaming agents, plasticizers, nucleating agents, anti-foaming agents, and/or cross-linking agents.

[Fibrous Inorganic Filler-Containing Pellet]

The fibrous inorganic filler-containing pellet preferably is in the form of cylinders having a diameter in the range of 1 to 5 mm and a length in the range of 1 to 5 mm. The weight of the fifty pellets preferably is in the range of 0.5 to 5.0 g.

The fibrous inorganic filler-containing pellets can be prepared, for example, by the steps of blending the olefin polymer, fibrous inorganic filler, elastomer, and lubricant, kneading the blended product under molten condition, and molding the kneaded product to give the desired pellets. The pellets can also be prepared by the steps of treating the surface of the fibrous inorganic filler with the lubricant to give fibrous inorganic filler having the surface coated with the lubricant, blending the surface-coated fibrous inorganic filler, olefin polymer, and elastomer, kneading the blended product under molten condition; and molding the kneaded product to give the pellets.

The fibrous inorganic filler-containing pellets of the present invention can advantageously used to produce a molded propylene polymer product. The fibrous inorganic filler-containing pellets can be blended with a matrix resin composition containing a propylene polymer to prepare the molded propylene polymer product.

[Matrix Resin Composition]

The matrix resin composition contains the propylene polymer in an amount of at least 30 wt. %. The propylene polymer contained in the matrix resin composition preferably has a melt flow rate (VER, determined by the method of ASTM D1238, temperature: 230° C., weight: 2.16 kg) in the range of 3 to 300 g/10 min.

The matrix resin composition can further contain a non-fibrous inorganic filler and/or an elastomer in addition to the propylene polymer.

Examples of the non-fibrous inorganic filler include talc, mica, calcium carbonate, barium sulfate, magnesium carbonate, clay, alumina, silica, calcium sulfate, magnesium hydroxide, dolomite, dawsonite, glass flake, glass babbles, glass beads, calcium silicate, smectite, montmorillonite, bentonite, kaolinite, carbon black, and titanium dioxide. Talc is preferred.

The non-fibrous inorganic filler preferably has an average particle size of less than 10 μm, more preferably of less than 5 μm. The average particle size of the non-fibrous inorganic filler can be determined by the known laser diffraction method.

The non-fibrous inorganic filler can be used without treatment. The filler can also be used after it is subjected to surface treatment using a silane-coupling agent, a titanium-coupling agent, or a surface-active agent to improve interfacial adhesion to the propylene polymer or to improve dispersability in the propylene polymer. Examples of the surface-active agents include a fatty acid, a fatty acid ester, and a metal salt of a fatty acid.

Examples of the elastomer possibly used in the matrix resin composition include ethylene-α-olefin copolymer elastomer and a styrene-containing elastomer, which are already described for the elastomers incorporated into the fibrous inorganic filler-containing pellets.

The matrix resin composition can further contain oxidation inhibitors, ultraviolet absorbers, pigments, antistatic agents, anti-copper agents, frame retarders, lubricants, neutralizers, foaming agents, plasticizers, nucleating agents, anti-foaming agents, and/or cross-linking agents.

The details of the matrix resin composition are determined in consideration of the desired nature of the molded product. The exterior of automobiles (e.g., bumper) requires highly increased flexural strength and impact resistance. The matrix resin composition for the exterior preferably is a talc-containing resin composition, which comprises a propylene polymer in an amount of 30 to 80 wt. %, talc in an amount of 5 to 40 wt. %, and an elastomer in an amount of 5 to 60 wt. %. The talc-containing resin mixture can be a solid mixture obtained by a dry blending process. The resin composition can also be a molten composition obtained by kneading the resin composition under molten condition. On the other hand, the interior of automobiles (e.g., door garnish) requires highly increased flexural strength. The matrix resin composition for the interior preferably consists essentially of a propylene polymer.

The matrix resin composition can be prepared in the form of powder, flakes, or pellets.

[Production of Molded Propylene Polymer Product]

The process for producing the molded propylene polymer product comprises the steps of blending the fibrous inorganic filler-containing pellets with the matrix resin composition, kneading the blended product under molten condition, and molding the kneaded product.

The fibrous inorganic filler-containing pellets and the matrix resin composition are blended preferably in a weight ratio (pellets:composition) of 3:97 to 55:45, more preferably in a weight ratio of 3:97 to 20:80.

In one process, the step of blending the fibrous inorganic filler-containing pellets with the matrix resin composition can be conducted in a blending apparatus, and the step of kneading the blended product and the step of molding the kneaded product can be successively conducted in a molding apparatus. This process is named "direct molding process". In one of other processes, the step of blending the fibrous inorganic filler-containing pellets with the matrix resin composition and the step of kneading the blended product are conducted in a kneading apparatus, and the step of molding the kneaded product is conducted in a molding apparatus. The direct molding process is effective to give a molded product having more increased flexural strength.

In conducting the direct molding process, it is preferred to use the matrix resin composition in the form of pellets. The pellets of the matrix resin composition preferably are in the form of cylinder. The pellets preferably have a diameter in the range of 1 to 5 mm and a length in the range of 1 to 5 mm. The pellets preferably have a weight in the range of 0.5 to 5.0 g in terms of the total weight of 50 pellets.

The fibrous inorganic filler-containing pellets and the matrix resin composition pellets can be blended in the blending apparatus. Examples of the blending apparatus include a tumbler or a Henschel mixer.

The blended pellets, that is, a mixture comprising the fibrous inorganic filler-containing pellets and the matrix resin composition pellets can be kneaded under molten condition, and successively molded in the molding apparatus. The molding apparatus can be an apparatus comprising a unit of kneading both pellets under molten condition, a mold, and a unit of supplying the kneaded product into the mold. The molding apparatus can also be an apparatus comprising a unit of molding the kneaded product to give a sheet, a mold, and a unit of supplying the sheet into a mold.

Figure 1:
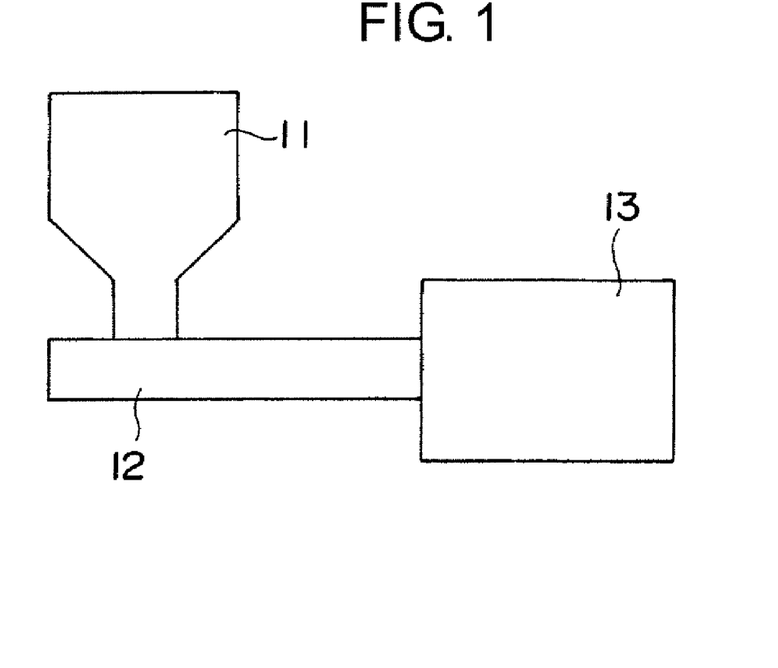
FIG. 1 is a block diagram showing an example of molding apparatus in which a resin composition is melted and molded.

FIG. 1 is a block diagram showing an example of molding apparatus of supplying a kneaded product into a mold and forming a molded product.

The molding apparatus shown in FIG. 1 comprises a hopper 11 storing the mixed pellets, a heating and melting apparatus 12 connected to the hopper 11, a molding apparatus 13 connected to the heating and melting apparatus 12. The heating and melting apparatus 12 preferably has a screw (not shown), which supply the kneaded pellets into the molding apparatus 13 while the kneaded pellets are stirred. The molding apparatus 13 may be a device of molding a kneaded melt to give a desired product by an extrusion method, an injection molding method, or a blow molding method. In the molding apparatus illustrated in FIG. 1, the mixed pellets stored in the hopper 11 are supplied into the heating and melting apparatus 12 at a constant supply rate, and heated and melted therein. The kneaded melt is then sent to the molding apparatus 13, introduced into a mold, molded to give the product having a desired shape, and then cooled.

Figure 2:
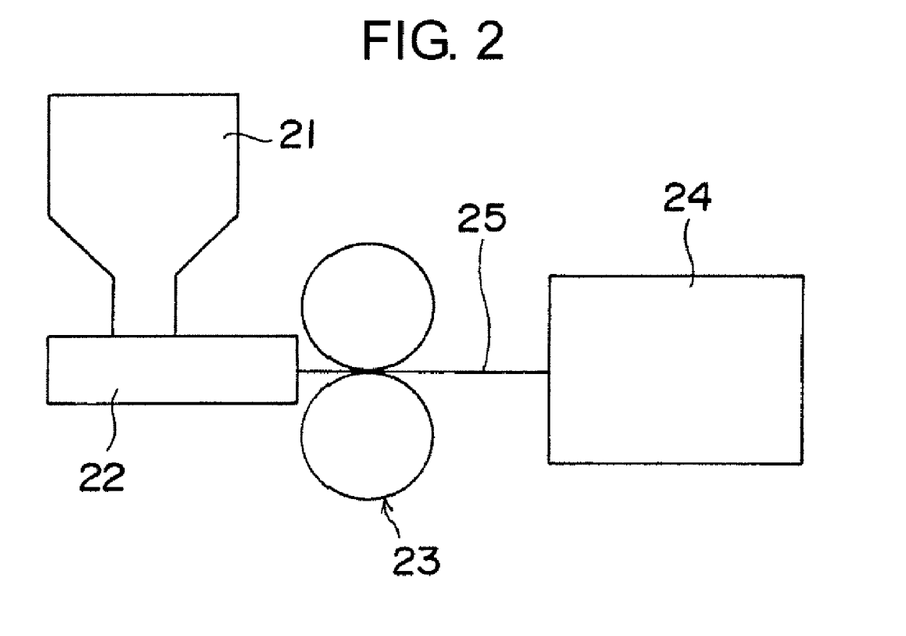
FIG. 2 is a block diagram showing another example of molding apparatus in which a resin composition is melted, processed to give a molded product in the form of sheet, and molded.

FIG. 2 is a block diagram showing another example of the molding apparatus for molding a melt of mixed pellets to give a sheet, introducing the sheet into a mold, and forming a molded product.

The molding apparatus shown in FIG. 2 comprises a hopper 21 storing the mixed pellets, a heating and melting apparatus 22 connected to the hopper 21, a sheet-forming apparatus 23 connected to the heating and melting apparatus 22, and a molding apparatus 24 connected to the sheet-forming apparatus 23. The sheet-forming apparatus 23 can be a device of pressing a molten product to give a sheet (that is, calender molding). The molding apparatus 24 can be a device of molding the sheet to give the desired molded product by a vacuum forming method or a press molding method. In the molding apparatus shown in FIG. 2, the mixed pellets stored in the hopper 21 is supplied into the heating and melting apparatus 22 at a constant supply rate, and heated and melted. The kneaded melt is sent to the sheet-forming apparatus 23, and molded to give a sheet. The sheet 25 is introduced into a mold of the molding apparatus 24, and molded to give a molded product having a desired shape.

As is described above, the step of blending the fibrous inorganic filler-containing pellets with a matrix resin composition and the step of kneading the mixture can be conducted in a kneading apparatus, and the step of molding the kneaded product can be conducted in a molding apparatus. Examples of the kneading apparatus include a uniaxial kneader, a biaxial kneader, a Banbury mixer, and a mixing roll. Before introducing the fibrous inorganic filler-containing pellets and the matrix resin composition into the kneading apparatus, they can be dry blended in a known mixer such as a tumbler or a Henschel mixer. Examples of the molding apparatus include a press machine (i.e., calender machine), a vacuum forming machine, an extruding machine, an injection molding machine, a blow molding machine, and a press molding machine.

WORKING EXAMPLES/COMPARISON EXAMPLES

In the following examples and comparison examples, the molded propylene polymer composition product was evaluated by measuring the Izod notched impact strength, flexural modulus, deflection temperature under load, and density according to the below-mentioned methods.

(1) Izod notched impact strength: The strength was determined −30° C. according to the procedure described in ASTM D256.

(2) Flexural modulus: The modules was determined according to the procedure described in ASTM D790.

(3) Deflection temperature under load: The temperature was determined according to the procedure described in ASTM D648.

(4) Density: The density was determined according to the procedure described in ASTM D792.

Example 1

(1) Preparation of Fibrous Basic Magnesium Sulfate-Containing Resin Composition Pellets In a tumbler, 10 weight parts of a propylene block copolymer (MFR: 50 g/10 min., determined at 230° C., using a weight of 2.16 kg), 70 weight parts of a fibrous basic magnesium sulfate (average fiber length: 15 μm, average fiber diameter: 0.5 μm), 20 weight parts of styrene/ethylene/propylene/styrene block copolymer elastomer (SEPS, MFR: 5 g/10 min., determined at 230° C. using a weight of 2.16 kg), and 1.47 weight parts of magnesium stearate (lubricant) were dry blended. The blended product was placed in a biaxial kneader, kneaded under molten condition at 200° C., and extruded to give an extruded product having strand shapes. The extended product was cooled with water, and cut by means of a strand cutter to give fibrous basic magnesium sulfate-containing resin composition pellets. The bulk density of the pellets was 1.47 g/cm³. The pellet had a cylindrical form having a diameter of approx. 3.4 win and a length of approx. 2.0 mm. The weight of fifty pellets was approx. 1.2 g.

(2) Preparation of Matrix Resin Composition Pellets

In a tumbler, 62 weight parts of a propylene block copolymer (MFR: 50 g/10 min. determined at 230° C. using a weight of 2.16 kg), 30 weight parts of ethylene/1-butene elastomer (EBR, MFR: 5 g/10 min., determined at 190° C. using a weight of 2.16 kg), 8 weight parts of talc (average particle size: 4.7 μm), and 0.1 weight part of calcium stearate were dry blended. The blended product was placed in a biaxial kneader, kneaded under molten condition at 200° C., and extruded to give an extruded product having strand shapes. The extended product was cut by means of a hot cutter to give matrix resin composition pellets. The pellets had a cylindrical form and had a bulk density of 0.96 g/cm³, a diameter of approx. 3.1 mm, the length of approx. 3.6 mm. The weight of fifty pellets was approx. 1.0 g.

(3) Production of Molded Fibrous Inorganic Filler-Containing Propylene Polymer Product The fibrous basic magnesium sulfate-containing resin composition pellets prepared in (1) above and the matrix resin composition pellets prepared in (2) above were placed in a tumbler. The weight ratio of the former pellets to the latter pellets was 7.2:92.8 (former to latter). The pellets were dry-blended. The dry-blended pellets was supplied into a biaxial kneader of a tandem type (NCM-30, Kobe Steel, Ltd.), kneaded under molten condition at 200° C., and extruded to give an extruded product having strand shapes. The extended product was cut by means of a strand cutter to give the desired propylene polymer composition pellets containing 5 wt. % of basic magnesium sulfate. The propylene polymer composition pellets were then placed in an injection-molding machine (J100SAII, The Japan Steel Works, Ltd.), melted at 200° C., and injection-molded to give a molded propylene polymer composition product.

The physical properties of the molded product were determined in the aforementioned manners.

Example 2

The procedures of Example 1 were repeated except that the fibrous basic magnesium sulfate-containing pellets were prepared employing the matrix resin composition pellets prepared in (2) in place of the propylene block copolymer, to give a molded propylene polymer composition product.

The physical properties of the molded product were determined in the aforementioned manners.

Example 3

The procedures of Example 1 were repeated except that the fibrous basic magnesium sulfate-containing pellets were prepared employing the matrix resin composition pellets prepared in (2) in place of the propylene block copolymer and further employing EBR (ethylene/1-butene elastomer) in place of the SEPS (styrene/ethylene/propylene/styrene block copolymer elastomer), to give a molded propylene polymer composition product.

The physical properties of the molded product were determined in the aforementioned manners.

Comparison Example 1

The procedures of Example 1 were repeated except that the fibrous basic magnesium sulfate-containing pellets were prepared employing a propylene homopolymer (MFR: 50 g/10 min., determined at 230° C. using a weight of 2.16 kg) in place of the combination of the propylene block copolymer and SEPS and that the molded propylene polymer product was produced employing the fibrous basic magnesium sulfate-containing pellets, matrix resin composition pellets, EBR and SEPS in a weight ratio of 7.2:90.8:0.6:1.4.

The physical properties of the molded product were determined in the aforementioned manners.

Comparison Example 2

The procedures of Example 1 were repeated except that the fibrous basic magnesium sulfate-containing pellets were prepared employing a propylene homopolymer (MFR: 50 g/10 min., determined at 230° C. using a weight of 2.16 kg) in place of the combination of the propylene block copolymer and SEPS, to give a molded propylene polymer composition product.

The physical properties of the molded product were determined in the aforementioned manners.

Reference Example 1

A molded propylene polymer composition product was produced by placing the matrix resin composition pellets (prepared in Example 1-(2)) in an injection-molding machine (J100SAII), melting the pellets at 200° C., and molding by injection.

The physical properties of the molded product were determined in the aforementioned manners.

[Compositions and Physical Properties of Molded Products]

The compositions of the fibrous basic magnesium sulfate-containing pellets are shown in Table 1-1.

The compositions of the matrix resin composition pellets are shown in Table 1-2.

The weight ratios of the fibrous magnesium sulfate-containing resin pellets, the matrix resin composition pellets, and the elastomers (EBR, SEPS) are shown in Table 1-3.

The compositions of the molded products are shown in Table 1-4.

The physical properties of the molded products are shown in Table 1-5.

TABLE 1-1

[Composition of fibrous basic magnesium sulfate-containing pellets (wt. %)]

|  | MOS | Olefin polymer | Elastomer EBR | Elastomer SEPS | Talc | Lubricant (Mg stearate) |
|---|---|---|---|---|---|---|
| Example 1 | 69.0 | 9.9 (PBC) | — | 19.7 | — | 1.4 |
| Example 2 | 69.0 | 6.1 (PBC) | 3.0 | 19.7 | 0.8 | 1.4 |
| Example 3 | 69.0 | 6.1 (PBC) | 22.7 | — | 0.8 | 1.4 |
| Com. Ex. 1 | 69.0 | 29.6 (PP) | — | — | — | 1.4 |
| Com. Ex. 2 | 69.0 | 29.6 (PP) | — | — | — | 1.4 |
| Ref. Ex. 1 | | | Not used | | | |

Remarks:
MOS: Fibrous basic magnesium sulfate
EBR: Ethylene/1-butene elastomer
SEPS: Styrene/ethylene/propylene/styrene block co-polymer elastomer
PBC: Propylene block copolymer
PP: Propylene homopolymer

TABLE 1-2

[Composition of matrix resin composition pellets (wt. %)]

|  | PBC | EBR | Talc | Ca stearate |
|---|---|---|---|---|
| Examples 1 to 3 | 61.9 | 30.0 | 8.0 | 0.1 |
| Com. Ex. 1 to 2 | 61.9 | 30.0 | 8.0 | 0.1 |
| Ref. Ex. 1 | 61.9 | 30.0 | 8.0 | 0.1 |

Remarks:
PBC: Propylene block copolymer
EBR: Ethylene/1-butene elastomer

TABLE 1-3

[Weight ratio of blended materials for preparation of molded product (wt. %)]

|  | Pellets MOS/Resin composition | Pellets Matrix resin composition | Elastomer EBR | Elastomer SEPS |
|---|---|---|---|---|
| Example 1 | 7.2 | 92.8 | — | — |
| Example 2 | 7.2 | 92.8 | — | — |
| Example 3 | 7.2 | 92.8 | — | — |
| Com. Ex. 1 | 7.2 | 90.8 | 0.6 | 1.4 |
| Com. Ex. 2 | 7.2 | 92.8 | — | — |
| Ref. Ex. 1 | — | 100 | — | — |

Remarks:
MOS: Fibrous basic magnesium sulfate
EBR: Ethylene-1-butene elastomer
SEPS: Styrene/ethylene/propylene/styrene block co-polymer elastomer

TABLE 1-4

[Composition of molded product (wt. %)]

|  | MOS | Propylene polymer | Elastomer EBR | Elastomer SEPS | Talc | Mg stearate/ Ca stearate |
|---|---|---|---|---|---|---|
| Example 1 | 5.0 | 58.2 | 27.8 | 1.4 | 7.4 | 0.1/0.1 |
| Example 2 | 5.0 | 57.9 | 28.1 | 1.4 | 7.4 | 0.1/0.1 |
| Example 3 | 5.0 | 57.9 | 29.4 | — | 7.5 | 0.1/0.1 |
| Com. Ex. 1 | 5.0 | 58.3 | 27.8 | 1.4 | 7.3 | 0.1/0.1 |
| Com. Ex. 2 | 5.0 | 59.6 | 27.8 | — | 7.4 | 0.1/0.1 |
| Ref. Ex. 1 | — | 61.9 | 30.0 | — | 8.0 | —/0.1 |

Remarks:
MOS: Fibrous basic magnesium sulfate
Propylene polymer: Propylene block copolymer and/or propylene homopolymer
EBR: Ethylene/1-butene elastomer
SEPS: Styrene/ethylene/propylene/styrene block co-polymer elastomer

TABLE 1-5

[Physical properties of molded product]

|  | Flexural modulus (MPa) | Izod impact strength (J/M) | Deflection temp. (° C.) under load | Density (g/cm³) |
|---|---|---|---|---|
| Example 1 | 2146 | 163 | 118 | 0.985 |
| Example 2 | 2138 | 170 | 118 | 0.984 |
| Example 3 | 2189 | 152 | 118 | 0.987 |
| Com. Ex. 1 | 2108 | 133 | 118 | 0.986 |
| Com. Ex. 2 | 2239 | 116 | 120 | 0.985 |
| Ref. Ex. 1 | 1749 | 123 | 117 | 0.956 |

As is evident from the data set forth in Tables 1-1 to 1-5, the molded products produced in Examples 1 to 3 and Comparison Examples 1 to 2 containing fibrous basic magnesium sulfate show apparently high flexural modulus, as compared with the molded product produced in Reference Example 1 containing no fibrous basic magnesium sulfate.

Further, the molded products produced in Examples 1 to 3 employing pellets containing both of fibrous basic magnesium sulfate and elastomer show prominently high Izod impact strength, as compared with the molded products produced in Comparison Examples 1 to 2 employing pellets containing fibrous basic magnesium sulfate only.

Example 4

The procedures of Example 1 were repeated except that the dry-blended pellets prepared in (3) were directly placed in the injection-molding machine, melted at 200° C., and injection-molded to give a molded propylene polymer composition product.

The physical properties of the molded product were determined in the aforementioned manners.

Example 5

The procedures of Example 2 were repeated except that the dry-blended pellets were directly placed in the injection-molding machine, melted at 200° C., and injection-molded to give a molded propylene polymer composition product.

The physical properties of the molded product were determined in the aforementioned manners.

Example 6

The procedures of Example 3 were repeated except that the dry-blended pellets were directly placed in the injection-molding machine, melted at 200° C., and injection-molded to give a molded propylene polymer composition product. The physical properties of the molded product were determined in the aforementioned manners.

Comparison Example 3

The procedures of Comparison Example 1 were repeated except that the dry-blended pellets were directly placed in the injection-molding machine, melted at 200° C., and injection-molded to give a molded propylene polymer composition product. The physical properties of the molded product were determined in the aforementioned manners.

Comparison Example 4

The procedures of Comparison Example 2 were repeated except that the dry-blended pellets were directly placed in the injection-molding machine, melted at 200° C., and injection-molded to give a molded propylene polymer composition product.

The physical properties of the molded product were determined in the aforementioned manners.

[Physical Properties of Molded Products]

The physical properties of the molded products produced in Examples 4 to 6 and Comparison Examples 3 to 4 are shown in Table 2.

TABLE 2

[Physical properties of molded product]

| | Flexural modulus (MPa) | Izod impact strength (J/M) | Deflection temp. (° C.) under load | Density (g/cm$^3$) |
|---|---|---|---|---|
| Example 4 | 2209 | 161 | 118 | 0.984 |
| Example 5 | 2254 | 156 | 119 | 0.987 |
| Example 6 | 2242 | 150 | 118 | 0.986 |
| Com. Ex. 3 | 2173 | 134 | 118 | 0.986 |
| Com. Ex. 4 | 2243 | 113 | 120 | 0.983 |

As is evident from the data set forth in Table 2, the molded products given in Examples 4 to 6 containing fibrous basic magnesium sulfate show apparently high flexural modulus as well as high flexural modulus even in the case that the dry-blended pellets are directly placed in the injection-molding machine and injection-molded without performing the kneading procedure in a kneader, to give a molded propylene polymer composition product.

Example 7

The procedures of Example 1 were repeated except that pellets comprising propylene copolymer [MFR: 45 g/10 min., determined at 230° C. using a weight of 2.16 kg] were employed as the matrix resin composition pellets, to give a molded propylene polymer composition product. The propylene copolymer pellets was in the form of cylinder having a diameter of approx. 3.4 mm, a length of 4.6 mm and having a bulk density of 0.91 g/cm$^3$. The weight of 50 pellets was 1.9 g.

The physical properties of the molded product were determined in the aforementioned manners.

Example 8

The procedures of Example 7 were repeated except that the dry-blended pellets were directly placed in the injection-molding machine, melted at 200° C., and injection-molded to give a molded propylene polymer composition product.

The physical properties of the molded product were determined in the aforementioned manners.

Comparison Example 5

The procedures of Example 1 were repeated except that the fibrous basic magnesium sulfate-containing pellets were prepared employing a propylene homopolymer (MFR: 50 g/10 min., determined at 230° C. using a weight of 2.16 kg) in place of the styrene/ethylene/propylene/styrene block copolymer elastomer (SEPS), that the pellets comprising propylene copolymer described in Example 7 were employed as the matrix resin composition pellets, and that the molded propylene polymer product was produced employing the fibrous basic magnesium sulfate-containing pellets, matrix resin composition pellets, and SEPS in a weight ratio of 7.2:91.4:1.4.

The physical properties of the molded product were determined in the aforementioned manners.

Comparison Example 6

The procedures of Comparison Example 5 were repeated except that the dry-blended pellets were directly placed in the injection-molding machine, melted at 200° C., and injection-molded to give a molded propylene polymer composition product.

The physical properties of the molded product were determined in the aforementioned manners.

Reference Example 2

A molded propylene polymer composition product was produced by placing the propylene copolymer pellets employed in Example 7 in an injection-molding machine (J100SAII), melting the pellets at 200° C., and molding by injection.

The physical properties of the molded product were determined in the aforementioned manners.

[Compositions and Physical Properties of Molded Products]

The compositions of the fibrous basic magnesium sulfate-containing pellets employed in Examples 7 to 8, Comparison Examples 5 to 6, and Reference Example 2 are shown in Table 3-1.

The compositions of the matrix resin composition pellets employed in Examples 7 to 8, Comparison Examples 5 to 6, and Reference Example 2 are shown in Table 3-2.

The weight ratios of the fibrous magnesium sulfate-containing resin pellets, the matrix resin composition pellets, and the elastomers (EBR, SEPS) employed in Examples 7 to 8, Comparison Examples 5 to 6, and Reference Example 2 are shown in Table 3-3.

The compositions of the molded products produced in Examples 7 to 8, Comparison Examples 5 to 6, and Reference Example 2 are shown in Table 3-4.

The physical properties of the molded products produced in Examples 7 to 8, Comparison Examples 5 to 6, and Reference Example 2 are shown in Table 3-5.

TABLE 3-1

[Composition of fibrous basic magnesium sulfate-containing pellets (wt. %)]

| | MOS | Olefin polymer | Elastomer (SEPS) | Lubricant (Mg stearate) |
|---|---|---|---|---|
| Example 7 | 69.0 | 9.9 (PBC) | 19.7 | 1.4 |
| Example 8 | 69.0 | 9.9 (PBC) | 19.7 | 1.4 |
| Com. Ex. 5 | 69.0 | 29.6 (PP) | — | 1.4 |
| Com. Ex. 6 | 69.0 | 29.6 (PP) | — | 1.4 |
| Ref. Ex. 2 | | | Not used | |

Remarks:
MOS: Fibrous basic magnesium sulfate
SEPS: Styrene-ethylene-propylene-styrene block co-polymer elastomer
PBC: Propylene block copolymer

TABLE 3-2

[Composition of matrix resin composition pellets (wt. %)]

|  | Propylene block copolymer |
|---|---|
| Examples 7 to 8 | 100 |
| Com. Ex. 5 to 6 | 100 |
| Ref. Ex. 2 | 100 |

TABLE 3-3

[Weight ratio of blended materials for preparation of molded product (wt. %)]

| | Pellets | | |
|---|---|---|---|
| | MOS/Resin composition | Matrix resin composition | Elastomer (SEPS) |
| Example 7 | 7.2 | 92.8 | — |
| Example 8 | 7.2 | 92.8 | — |
| Com. Ex. 5 | 7.2 | 91.4 | 1.4 |
| Com. Ex. 6 | 7.2 | 91.4 | 1.4 |
| Ref. Ex. 2 | — | 100 | — |

Remarks:
MOS: Fibrous basic magnesium sulfate
SEPS: Styrene/ethylene/propylene/styrene block co-polymer elastomer

TABLE 3-4

[Composition of molded product (wt. %)]

| | MOS | Propylene polymer | Elastomer (SEPS) | Mg stearate |
|---|---|---|---|---|
| Example 7 | 5.0 | 93.5 | 1.4 | 0.1 |
| Example 8 | 5.0 | 93.5 | 1.4 | 0.1 |
| Com. Ex. 5 | 5.0 | 93.5 | 1.4 | 0.1 |
| Com. Ex. 6 | 5.0 | 93.5 | 1.4 | 0.1 |
| Ref. Ex. 2 | — | 100 | — | — |

Remarks:
MOS: Fibrous basic magnesium sulfate
SEPS: Styrene/ethylene/propylene/styrene block co-polymer elastomer

TABLE 3-5

[Physical properties of molded product]

| | Flexural modulus (MPa) | Izod impact strength (J/M) | Deflection temp. (° C.) under load | Density (g/cm$^3$) |
|---|---|---|---|---|
| Example 7 | 2388 | 48 | 135 | 0.927 |
| Example 8 | 2569 | 43 | 133 | 0.931 |
| Com. Ex. 5 | 2334 | 33 | 136 | 0.929 |
| Com. Ex. 6 | 2282 | 31 | 136 | 0.927 |
| Ref. Ex. 2 | 1880 | 33 | 135 | 0.902 |

As is evident from the data set forth in Tables 3-1 to 3-5, the molded products produced in Examples 7 to 8 and Comparison Examples 5 to 6 containing fibrous basic magnesium sulfate show apparently high flexural modulus, as compared with the molded product produced in Reference Example 2 containing no fibrous basic magnesium sulfate.

Further, the molded-products produced in Examples 7 to 8 employing pellets containing both of fibrous basic magnesium sulfate and elastomer show prominently high Izod impact strength, as compared with the molded products produced in Comparison Examples 5 to 6 employing pellets containing fibrous basic magnesium sulfate only.

Example 9

The procedures of Example 1 were repeated except that the fibrous basic magnesium sulfate-containing pellets were prepared employing 0.74 weight part of magnesium stearate and 0.74 weight part of stearic acid and that the molded propylene polymer product was produced by dry blending the fibrous basic magnesium sulfate-containing pellets and matrix resin composition pellets in a weight ratio of 7.2:92.8 and placing the dry-blended pellets directly in the injection-molding machine, melted at 200° C., and injection-molded.

The physical properties of the molded product were as follows:
Flexural modulus: 2197 MPa
Izod impact strength: 143 J/M
Deflection temperature under load: 118° C.
Density: 0.985 g/cm$^3$

What is claimed is:

1. A process for producing a molded propylene polymer product containing a fibrous inorganic filler, which comprises the steps:
    blending fibrous inorganic filler-containing pellets with a matrix resin composition containing a propylene polymer, said pellets comprising a fibrous inorganic filler in an amount of 35 to 80 wt. %, an olefin polymer in an amount of 1 to 45 wt. %, an elastomer in an amount of 5 to 45 wt. %, and a lubricant selected from the group consisting of a fatty acid, a metal salt of a fatty acid, and a fatty acid ester in an amount of 0.3 to 10.0 wt. %, said amounts being based on the total weight amount of the pellets;
    kneading the blended product under molten condition; and
    molding the kneaded product.

2. The process of claim 1, wherein the step of blending fibrous inorganic filler-containing pellets with a matrix resin composition is conducted in a blending apparatus, and the step of kneading the blended product and the step of molding the kneaded product are successively conducted in a molding apparatus.

3. The process of claim 1, wherein the step of blending fibrous inorganic filler-containing pellets with a matrix resin composition and the step of kneading the blended product are conducted in a kneading apparatus, and the step of molding the kneaded product is conducted in a molding apparatus.

4. The process of claim 1, wherein the fibrous inorganic filler comprises fibrous basic magnesium sulfate.

5. The process of claim 1, wherein the lubricant comprises the metal salt of a fatty acid, said metal being selected from the group consisting of magnesium, calcium, lithium, and zinc.

6. The process of claim 1, wherein the olefin polymer is a propylene polymer.

7. The process of claim 1, wherein the elastomer is selected from the group consisting of ethylene-butene elastomer, ethylene-octene elastomer, and styrene unit-containing elastomer.

8. The process of claim 1, wherein the fibrous inorganic filler-containing pellets contain a fibrous inorganic filler in an amount of 73 to 99 weight parts based on 100 weight parts of the total amount of the olefin polymer and fibrous inorganic filler.

9. The process of claim 1, wherein the matrix resin composition contains the propylene polymer in an amount of at least 30 wt. %.

10. The process of claim 9, wherein the matrix resin composition is a mixture comprising the propylene polymer in an amount of 30 to 80 wt. %, talc in an amount of 5 to 40 wt. %, and an elastomer in an amount of 5 to 60 wt. %.

11. The process of claim 9, wherein the matrix resin composition is a kneaded product prepared under molten condition, said kneaded product comprising the propylene polymer in an amount of 30 to 80 wt. %, talc in an amount of 5 to 40 wt. %, and an elastomer in an amount of 5 to 60 wt. %.

12. The process of claim 1, wherein the fibrous inorganic filler-containing pellets and the matrix resin composition are blended in a weight ratio of 3:97 to 55:45.

13. Fibrous inorganic filler-containing pellets comprising a fibrous inorganic filler in an amount of 35 to 80 wt. %, an olefin polymer in an amount of 1 to 45 wt. %, an elastomer in an amount of 5 to 45 wt. %, and a lubricant selected from the group consisting of a fatty acid, a metal salt of a fatty acid, and a fatty acid ester in an amount of 0.3 to 10.0 wt. %, said amounts being based on the total weight amount of the pellets.

14. The fibrous inorganic filler-containing pellets of claim 13, wherein the fibrous inorganic filler comprises fibrous basic magnesium sulfate.

15. The fibrous inorganic filler-containing pellets of claim 13, wherein the lubricant comprises the metal salt of a fatty acid, said metal being selected from the group consisting of magnesium, calcium, lithium, and zinc.

16. The fibrous inorganic filler-containing pellets of claim 13, wherein the olefin polymer is a propylene polymer.

17. The fibrous inorganic filler-containing pellets of claim 13, wherein the elastomer is selected from the group consisting of an ethylene-butene elastomer, an ethylene-octene elastomer, and a styrene unit-containing elastomer.

18. The fibrous inorganic filler-containing pellets of claim 13, wherein the fibrous inorganic filler-containing pellets contain a fibrous inorganic filler in an amount of 73 to 99 weight parts based on 100 weight parts of the total amount of the olefin polymer and fibrous inorganic filler.

* * * * *